United States Patent

[11] 3,604,814

[72] Inventor  Leonard T. Skeggs
              Kirtland, Ohio
[21] Appl. No. 835,051
[22] Filed     June 20, 1969
[45] Patented  Sept. 14, 1971
[73] Assignee  Technicon Corporation
              Tarrytown, N.Y.

[54] METHOD AND APPARATUS FOR THE SEQUENTIAL ANALYSIS OF FLUID SAMPLES
7 Claims, 3 Drawing Figs.

[52] U.S. Cl. .................................................. 356/181
[51] Int. Cl. .................................................. G01j 3/46
[50] Field of Search .......................................... 356/181,
                                           72; 137/3; 23/252

[56]                References Cited
                UNITED STATES PATENTS
3,241,432  3/1966  Skeggs et al. .................. 250/218 X
3,010,798  11/1961  Whitehead et al. ............ 356/72 X Primary Examiner—Ronald L. Wibert
Assistant Examiner—Conrad Clark
Attorney—S. P. Tedesco ABSTRACT: Method and apparatus are provided for the sequential analysis of a series of fluid samples with respect to different constituents thereof through the simultaneous flow of different sample portions through different flow paths for treatment thereof with respect to different ones of said constituents and the subsequent, sequential flow of the thusly treated sample portions through the same analysis means for the sequential analysis of said different sample portions with regard to different ones of said constituents.

PATENTED SEP 14 1971

INVENTOR.
LEONARD T. SKEGGS

BY James J. Romano, Jr.
ATTORNEY

METHOD AND APPARATUS FOR THE SEQUENTIAL ANALYSIS OF FLUID SAMPLES

BACKGROUND OF THE INVENTION

1. Field of the Invention

This invention relates to the quantitative analysis of fluids with respect to one or more constituents thereof and, more particularly, to method and apparatus for the automatic, sequential quantitative analysis of a series of fluid samples with respect to one or more constituents thereof through the use of single quantitative analysis means.

2. Background of the Invention

Although apparatus for the automatic, sequential quantitative analysis of a series of fluid samples with respect one one or more constituents thereof are known, as shown and described for example in U.S. Pat. No. 3,241,432 issued Mar. 22, 1966 to Leonard T. Skeggs, et al., and have gained remarkably wide commercial acceptance through the extremely rapid and reliable operation thereof and the extremely accurate results provided thereby, it may be understood that such apparatus will, in general, be found to require the use of separate quantitative analysis means for each of the fluid sample constituents of interest. More specifically, it may be understood that such apparatus function by the division of a fluid sample into a plurality of quotients for flow along parallel flow paths, the treatment of each of said quotients within each of said flow paths by dialysis, incubation, heating and/or the mixture thereof with suitable color-producing reagents, in a manner appropriate, in each instance, to the quantitative analysis thereof with respect to a different one of said sample constituents, and the successive flow of the thusly treated quotients to quantitative analysis means in the nature of a plurality of colorimeter means, each of which forms the terminus of one of said parallel flow paths and is effective to perform the quantitative analysis function with respect to a different one of said constituents. Accordingly, and since as is believed well known by those skilled in this art, the said colorimetric quantitative analysis means account for a not insubstantial portion of the cost of such apparatus, it may be readily understood that the latter may be reduced by a not insubstantial extent through the provision of apparatus which can perform substantially the same function at substantially the same fluid sample analysis rate through the use of single colorimetric quantitative analysis means, only.

In addition, it may be understood that any change in the fluid sample constituents to be appropriately treated for quantitative analysis in each of said parallel flow paths of the prior art apparatus, as described hereinabove, will in most instances, require modification in the nature of connection and/or disconnection of different fluid sample treatment means in the said flow path.

Further, although apparatus which are effective to automatically, sequentially quantitatively analyze a series of fluid samples through the use of single quantitative analysis means are known to applicant and take the form of those shown and described in the copending application of Frants J. B. T. Ludvigsen, Ser. No. 732,731, filed May 28, 1968, and assigned to the assignee hereof, it may be understood that such apparatus, once set up, are effective to quantitatively analyze the said fluid samples with respect to only one constituent thereof. This is to say that although fluid sample flow-directing means which take the form of manually operable valve means are included in such apparatus and are effective to vary the flow path configuration thereof to adapt the apparatus for quantitative analysis with regard to different fluid sample constituents, it may be understood that once a particular flow path configuration is established, through manipulation of said valve means, this apparatus is effective to analyze for one fluid sample constituent, only, and that no variation can be made therein during the course of apparatus operation. Accordingly, it is believed clear that such apparatus although, of course, suitable for the disclosed purposes thereof, are somewhat limited in versatility and cannot, in any event, be utilized for the automatic, sequential quantitative analysis of a series of fluid samples with respect to at least two constituents of each of said samples.

OBJECTS OF THE INVENTION

It is, accordingly, an object of this invention to provide method and apparatus for the automatic, sequential quantitative analysis of a series of fluid samples with respect to one or more constituents thereof through the use of single quantitative analysis means.

Another object of this invention is the provision of method and apparatus for the automatic, sequential quantitative analysis of a series of fluid samples with respect to at least two constituents of each of said samples through the use of single quantitative analysis means, whereby the cost of said apparatus may be reduced to a not insubstantial extent.

Another object of this invention is the provision of method and apparatus as above wherein changes in the particular fluid sample constituents of interest can readily be accommodated without requiring external changes in apparatus configuration, to thus provide for significant method and apparatus versatility.

A further object of this invention is the provision of apparatus as above which require the use of only readily available components of proven dependability to thus provide for long periods of satisfactory, maintenance-free apparatus operation.

A still further object of this invention is the provision of method and apparatus as above which are particularly, though by no means exclusively, adapted for the automatic, sequential quantitative analysis of a series of blood serum samples with respect to at least two constituents of each of said blood serum samples.

SUMMARY OF THE INVENTION

As currently preferred, the method and apparatus of the invention comprises the use of fluid sample supply means for the supply of a series of fluid samples thereto, and sample analysis means in the nature of single colorimeter means for the quantitative analysis of said samples with respect to different constituents thereof. Different flow paths are provided between said sample supply means and said colorimeter means, and sample treatment means, including means to introduce different sample treatment fluids, are included in each of said flow paths for treatment of said samples for analysis with respect to different constituents thereof. Valve means are provided to control sample flow through said different flow paths, and the introduction of said sample treatment fluids thereto, and are operated by control means in the nature of programmed timer means during operation of the apparatus to open and close in predetermined sequence to direct different sample portions for simultaneous flow in said different flow paths and treatment therein for analysis with respect to said different constituents, and to direct the thusly treated sample portions, in sequence, for flow through said colorimeter means. The different flow paths include valve-controlled parallel flow path portions, and are arranged to provide for substantially equal sample portion flow times between said sample supply means and said colorimeter means. A plurality of light filters, each of which is appropriate to colorimetric analysis of said samples with regard to a different constituent thereof, are provided, and are operatively positionable in sequence in said colorimeter means under the control of said control means in accordance with the sequence of analysis of said different constituents. Recorder means are operatively associated with the colorimeter means and are operable to record the colorimetric analysis results on recorder chart means. Recorder chart base line adjustment means are provided and take the form of either a plurality of adjustable base line potentiometers which are appropriately connectable, under the control of said control means, in the measuring and operating circuit of the recorder means, or a plurality of adjustable apertures, each of which is operatively associated with one of said light filters to control the amount of light transmitted therethrough.

BRIEF DESCRIPTION OF THE DRAWINGS

The above and other objects and advantages of this invention are believed made clear by the following detailed description of the invention wherein:

Referring now to FIG. 1, the apparatus comprises a sample supply device, as generally indicated at 10, for supplying a successive series of liquid samples, spaced by intervening segments of air and a suitable wash liquid, to a conduit 12. The sample supply device 10 may, for example, be of the type shown and described in U.S. Pat. No. 3,230,776 issued to Jack Isreeli et al. on Jan. 25, 1966, and comprises a plurality of sample cups 14 disposed as shown on a turntable 16 which is intermittently rotated past an off-take tube assembly 18 to sequentially present each of the said cups to the said assembly. As each cup 14 is presented to the off-take tube assembly 18, the inlet end of the off-take tube 20 is disposed therein for a predetermined period of time to aspirate a measured volume of sample therefrom. Alternatively, between successive samples, the said off-take tube inlet end is disposed in a container 22 of a suitable wash liquid for the aspiration of a measured volume of said wash liquid therefrom.

Figure 1:
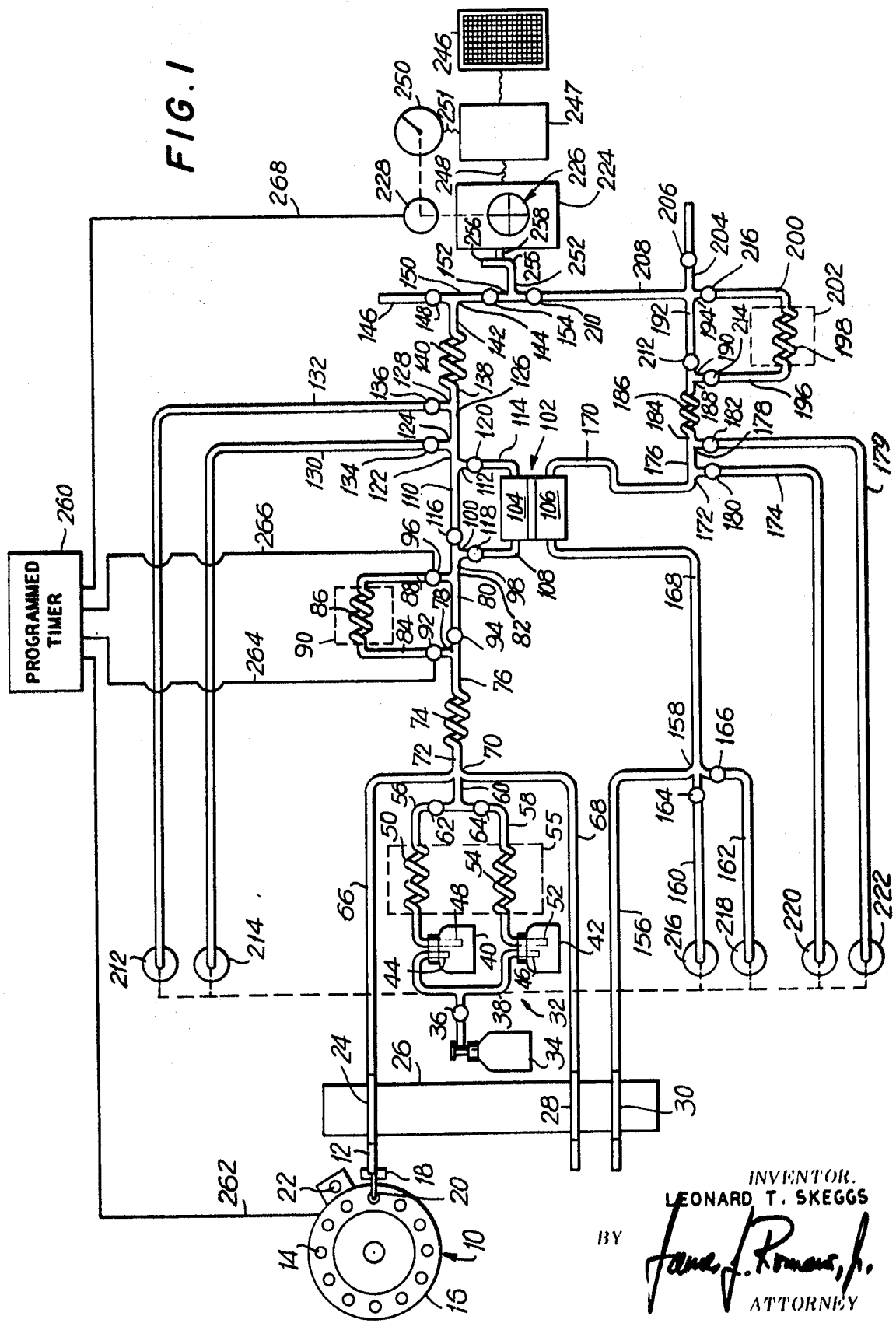
FIG. 1 is a schematic or flow diagram of a single channel, sequential analysis apparatus constructed in accordance with the teachings of this invention.

The outlet end of conduit 12 is coupled to a resiliently compressible pump tube 24 of a proportioning pump 26 which may, for example, take the form of the peristaltic pump shown and described in U.S. Pat. No. 2,935,028 issued May 3, 1960, to Andres Ferrari et al. The pump tube 24, and the pump tubes 28 and 30, as described in greater detail hereinbelow, are disposed on a pump platen and are concomitantly, progressively occluded along their respective lengths by a plurality of pump rollers to advance fluid through the tubes, with the respective volumetric flow rates therethrough being determined, of course, by the respective pump tube diameters and relative roller velocities.

Pressure pumping means are indicated generally at 32 and may be seen to comprise a tank 34 of a suitably inert gas at suitable pressure, as for example nitrogen at 2200 p.s.i., connected through pressure regulator means as indicated at 36 to a branched conduit or manifold 38 to maintain the latter at a substantially constant pressure in the nature, for example, of 66.8 cm. Hg.

The respective interiors of flasks 40 and 42, each of which contains a suitable, liquid sample diluent in the nature, for example, of water of clinical purity, are connected as shown by relatively short inlet conduits 44 and 46 to the branch conduit 38. An outlet conduit 48 connects the interior of flask 40 to a high-flow-resistance coil 50, while an outlet conduit 52 connects the interior of flask 42 to a high flow resistance coil 54.

The respective internal diameters of the high resistance coils 50 and 54 are made relatively small on the order, for example of 0.010 inch or 0.25 mm., while the respective lengths thereof are made relatively long on the order, for example of 210 inches for liquids to provide the desired high flow impedance and attendant desired relatively low flow rates. Preferably, the respective high resistance coils 50 and 54 are disposed in a temperature control bath as indicated at 55 which operates at a suitable temperature in the nature, for example, of 37° C. to maintain the fluids passing through the coils at substantially constant pressure and viscosity. If desired, the respective flasks 40 and 42, and the respective connecting conduits 48 and 52, may also be disposed in the said temperature control bath, or means of similar nature, for obvious purposes.

Outlet conduits 56 and 58 extend from the respective high flow resistance coils 50 and 54 to merge as shown with a conduit 60.

Valve means as indicated at 62 and 64 are disposed as shown in the respective outlet conduits 56 and 58 for control of the respective fluid flows therethrough. Preferably, and in a manner and for reasons described in greater detail hereinbelow, each of the valve means 62 and 64 are automatically operable through the use of valve control means in the nature, for example, of valve-operating solenoids which are included therein, whereby may be readily understood that the respective openings and closings of the said valve means, and the respective dwell times thereof, may be suitably and conveniently controlled from remote valve control means which are effective to control the energization and deenergization of the valve-operating solenoids.

The outlet ends of the resiliently compressible pump tubes 24 and 28 of the peristaltic pumping means 26 are respectively connected to conduits 66 and 68 which merge in turn with conduit 60 of the pressure pumping means 32 at a conduit junction as indicated at 70. Therefrom, a conduit 72 connects the thusly merged pumped fluids to a horizontal mixing coil 74 which may, for example take the form of that shown and described in U.S. Pat. No. 2,933,293, issued Apr. 19, 1960 to Andres Ferrari, Jr.

A conduit 76 connects the outlet end of horizontal mixing coil 74 to a conduit junction as indicated at 78. A conduit 80 connects one outlet of conduit junction 78 to one inlet of a conduit junction as indicated at 82, while the other outlet of the conduit junction 78 is connected by conduit 84, incubating coil 86, and conduit 88, respectively, to the other inlet of conduit junction 82. The incubating coil 86 is disposed as illustrated in a temperature control bath 90 which is effective to maintain the temperature of the fluid flowing therethrough at a substantially constant level in the order, for example, of 37° C.

Valve means 92, 94, and 96, each of which preferably takes the form of valve means 62 and 64 as described hereinabove, are respectively disposed as shown in conduit 84 just downstream of conduit junction 78, in conduit 80 just downstream of the said conduit junction, and in conduit 88 just upstream of conduit junction 82. A conduit 98 connects the outlet of conduit junction 82 to the inlet of a conduit junction as indicated at 100.

By this arrangement is believed made clear that parallel flow paths are provided for the flow of fluid from conduits 76 to conduit 98. More specifically, it may readily be understood that with valve means 92 and 96 open, and valve means 94 closed, fluid will, of necessity, pass through conduits 84 and 88, and the incubating coil 86, in flowing from conduit 76 to conduit 98. Alternatively, with valve means 92 and 96 closed, and valve means 94 open, fluid will, of necessity, pass directly through conduit 80 in flowing from conduit 76 to conduit 98.

Dialyzer means which may, for example, take the form of those shown and described in U.S. Pat. No. 3,333,706 issued Aug. 1, 1967 to Jack Isreeli, are indicated generally at 102, and may be understood to comprise a donor stream passageway 104 and a recipient stream passageway 106.

A conduit 108 connects one outlet of the conduit junction 100 to the inlet of the donor stream passageway 104, while a conduit 110 connects the other outlet of the conduit junction 100 to one inlet of a conduit junction as indicated at 112, and a conduit 114 connects the outlet of the donor stream passageway 104 to the other inlet of the conduit junction 112.

Valve means 116, 118 and 120, each of which again preferably takes the form described hereinabove, are respectively disposed as shown in conduit 110 just downstream of conduit junction 100, in conduit 108 just downstream of the said conduit junction, and in conduit 114 just upstream of the conduit junction 112. A conduit 122 connects the outlet of conduit junction 112 to one inlet of a conduit junction as indicated at 124.

By this arrangement, and through suitable control of the respective valve means 116, 118 and 120, it may again be readily understood that parallel flow paths are provided between conduits 98 and 122, with one of said flow paths being formed primarily by conduit 110, and the other of said flow paths being formed primarily by conduits 108 and 114 and a dialyzer means down or passageway 104.

A conduit 126 connects the outlet of conduit junction 124 to an inlet of a conduit junction as indicated at 128. A conduit 130 is connected to the other inlet of the conduit junction 124, while a conduit 132 is connected to the other inlet of the conduit junction 128. Valve means which are again preferably of the form described hereinabove, are indicated at 134 and 136 and are respectively disposed as shown in the conduits 130 and 132 to control fluid flow therethrough, whereby is believed made clear that selective merger of the respective fluids flowing in conduits 130 and 132 with the fluid flowing in conduit 122 may readily be effected through suitable operation of the respective valve means 134 and 136.

A conduit 138 connects the outlet of conduit junction 128 to the inlet of a horizontal mixing coil 140 which preferably takes the form of mixing coil 74 as described hereinabove, while a conduit 142 connects the outlet of the mixing coil 140 to a conduit junction as indicated at 144.

A conduit 146 connects one outlet of conduit junction 144 to suitable, nonillustrated waste fluid collection means, and valve means 148, again of the form described hereinabove, are disposed as shown in conduit 146 for obvious purpose.

A conduit 150 connects the other outlet of conduit junction 144 to the inlet of a conduit junction as indicated at 152, and valve means 154, again as described hereinabove, are disposed as shown in conduit 150 just upstream of conduit junction 152 for obvious purpose.

Referring again to resiliently compressible pump tube 30 of the proportioning pump means 26, it may be seen that a conduit 156 connects the outlet thereof to one inlet of a conduit junction as indicated at 158, while conduits 160 and 162 are respectively connected as shown to the other inlets of the said conduit junction. Valve means 164 and 166, again as described hereinabove, are respectively disposed as shown in conduits 160 and 162 to control fluid flow therethrough into the conduit junction 158.

A conduit 168 connects the outlet of the conduit junction 158 to the inlet of the recipient stream passageway 106 of the dialyzer means 102, while a conduit 170 connects the outlet of the said recipient stream passageway to an inlet of a conduit junction as indicated at 172.

A conduit 174 is connected to the other inlet of the conduit junction 172, and a conduit 176 connects the outlet thereof to one inlet of a conduit junction as indicated at 178. A conduit 179 is connected as shown to the other inlet of the conduit junction 178. Valve means 180 and 182, again as described hereinabove, are respectively disposed as shown in the conduits 174 and 179 to control fluid flow therethrough to the respective conduit junctions 172 and 178.

A conduit 184 connects the outlet of conduit junction 178 to the inlet of a horizontal mixing coil 186, which preferably takes the form described hereinabove with regard to horizontal mixing coils 74 and 140, while a conduit 188 connects the outlet of the horizontal mixing coil 186 to the inlet of a conduit junction as indicated at 190.

A conduit 192 connects one outlet of conduit junction 190 to one inlet of a conduit junction as indicated at 194, while the other outlet of the conduit junction 190 is connected, through conduit 196, heating or reaction coil 198 and conduit 200, to the other inlet of the conduit junction 194. The heating or reaction coil 198 may, for example, take the form of that shown and described in U.S. Pat. No. 3,057,603 issued Oct. 9, 1962 to Jack Isreeli, and is disposed in a temperature control bath 202 for maintenance of the temperature thereof, and of the fluid flowing therethrough, at a predetermined level in the order, for example, of 90° C.

A conduit 204 connects one outlet of conduit junction 194 to suitable, nonillustrated waste collection means, and valve means 206, again as described hereinabove, are disposed therein just downstream of the said conduit junction for obvious purpose. A conduit 208 connects the other outlet of conduit junction 194 to the other inlet of conduit junction 152, and valve means 210, again as described hereinabove, are disposed as shown in conduit 208 just downstream of conduit junction 152 to control fluid flow from the former to the latter.

Valve means 212, 214 and 216, again as described hereinabove, are respectively disposed as shown in conduit 192 just downstream of conduit junction 190, in conduit 196 just downstream of conduit junction 190, and in conduit 200 just upstream of conduit junction 194. By this arrangement, and through appropriate control of the respective valve means 212, 214 and 216, it may readily be understood that parallel flow paths are provided between conduit 188 and the outlet side of conduit junction 194, with one of said flow paths being provided primarily by conduit 192, and the other of said flow paths being provided primarily by conduit 196, heating or reaction coil 198 and conduit 200.

Referring again to the conduits 132, 130, 160, 162, 174, and 179, it may be seen that the respective inlet ends thereof are disposed in flasks as indicated at 212, 214, 216, 218, 220 and 222, respectively, and it may be understood that each of the said flasks is operatively associated with the branched conduit or manifold 38 of the pressure-pumping means 32, as indicated by the dashed lines extending therebetween, to provide for the pressure pumping of fluids from the respective flasks 212, 214, 216, 218, 220 and 222 through the respective conduits 132, 130, 160, 162, 174 and 179 in the manner described in detail hereinabove with regard to the pressure pumping of fluids from the flasks 40 and 42 through high flow resistance coils 50 and 54 and conduits 56 and 58, respectively.

Colorimeter means indicated at 224 and may, for example, take the basic form of those shown and described in U.S. Pat. No. 3,241,432 issued Mar. 22, 1966 to Leonard T. Skeggs et al. As such, it may be understood that the said colorimeter means would include a flow cell through which appropriately treated fluid sample quotients would be flowed for quantitative analysis with respect to various constituents thereof on the basis of the light transmittance of the said fluid sample quotients as measured by photoelectric, light transmittance sensing means. Normally included in such colorimeter means would be appropriate light filter means to provide for passage through the relevant portion of the colorimeter means flow cell of light substantially of a certain predetermined wavelength, only, to maximize the sensitivity, and accordingly the accuracy, of the said photoelectric light transmittance sensing means with regard to the particular fluid sample quotient constituent of interest.

The particular wavelength of transmitted light which will provide for maximum photoelectric light transmittance sensing means sensitivity is dependent in large part upon the particular fluid sample constituent of interest, whereby it may be understood that separate filter means of different light transmittance characteristics may advantageously be provided for the quantitative analysis of the same fluid sample with respect to different constituents thereof through use of the same colorimeter means. Further discussion of interest with regard to the purpose and function of light filters in colorimetric analysis means may, if desired, be found on pages 477 through pages 483, of the twelfth edition of "Practical Physiological Chemistry" by Hawk, Oser and Summerson, published in 1947 by The Blakiston Company of Philadelphia, Pennsylvania.

Accordingly, and since the apparatus of said invention provides for the quantitative analysis of successive, appropriately treated fluid sample quotients of the same fluid sample with regard to different fluid sample constituents through use of the same colorimeter means, all as described in greater detail hereinbelow, it may be understood that plural filter means, as indicated generally at 226, are provided and are operatively associated as indicated with filter positioning means 228 to enable the operative positioning of the appropriate filter relative to the colorimeter means flow cell and light source in accordance with the particular fluid sample constituent of interest as contained in the appropriately treated fluid sample quotient flowing, at that time, through the colorimeter means flow cell.

Figure 2:
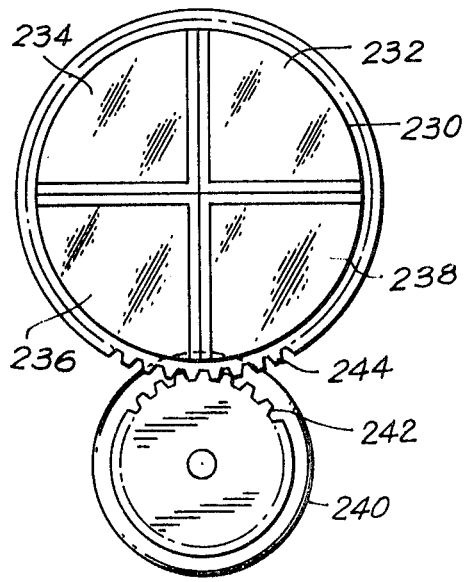
FIG. 2 is a side elevational view of a colorimeter filter wheel for use in the apparatus of FIG. 1.

The plural filter means 226, and the positioning means 228 may, for example, take the form of those above shown and described in U.S. Pat. No. 3,010,798, issued Nov. 28, 1961 to Edwin C. Whitehead, et al. and, to this effect, may be seen in FIG. 2 to comprise a filter wheel 230 containing therein appropriately spaced filters 232, 234, 236 and 238, each of which is, of course, substantially effective to pass light of a different predetermined wavelength. A filter wheel drive motor, which preferably takes the form of any suitable electric motor, is indicated at 240 and is effective to rotate a drive gear 242. A driven gear 244 is disposed as indicated around the filter wheel 230 and meshes as shown with the drive gear 242 whereby is believed made clear that appropriate energization and deenergization of the drive motor 240 will be effective to selectively position the respective filters 232, 234, 236 and 238 in operative position relative to the nonillustrated colorimeter means light source and flow cell.

With further regard to the filter wheel 230, it is believed clear that the disclosure thereof as containing four filters if for purposes of illustration, only, and is based upon the assumption made for purposes of example, only, as described in greater detail hereinbelow, that the apparatus of the invention be applied to the quantitative analysis of each fluid sample with respect to four constituents thereof. Accordingly, it may be readily understood that the said filter wheel may, of course, include a greater or lesser number of filters.

Recorder means which may, for example, take the form of the strip chart recorder means shown and described in said U.S. Pat. No. 3,241,342 are indicated at 246 and may be understood to include a measuring and operating circuit 246 which is operatively connected to the output of the colorimeter means 224, as indicated by the electrical lead 248 extending therebetween, to provide a permanent and readily readable record of the results of the operation of the said colorimeter means.

Included in the measuring and operating circuit 247 of the recorder means 246 would be a plurality of nonillustrated base line potentiometer means which function, as described in said U.S. Pat. No. 3,241,432, to provide for a 100 percent light transmittance or base line adjustment when shifting from the quantative analysis for one constituent to the quantitative analysis for a different constituent to thus enable the provision of a common base line on the recorder chart and greatly simplify chart analysis and interpretation. Accordingly, and since in this instance a number of different constituents are being quantitatively analyzed for through the use of the same colorimeter means, a plurality of said base line potentiometers would be included in said measuring and operating circuit, with each of the same being effective to appropriately establish this base line for a different one of said constituents.

If, as discussed hereinabove, it is assumed that the apparatus of the invention is set up to test successive fluid samples for four different constituents thereof, it may be understood that four of such base line potentiometers would be required in the recorder measuring and operating circuit 247.

Four position stepping switch means as schematically indicated at 250 which may, for example, take the form of those shown and described in said U.S. Pat. No. 3,241,432, are provided and are operatively connected in the recorder measuring and operating circuit 247, as indicated by electrical lead 251, to connect the said base line potentiometers in the said measuring and operating circuit in proper sequence. Since, as is believed clear, the operation of said stepping switch means would, of necessity, be synchronized with the operation of the plural filter means 226, it may be understood that the stepping switch means 250 may conveniently be driven from the filter drive means 228, and this is indicated by the dashed line extending therebetween. The four position stepping switch means 250 would be connected in the recorder measuring and operating circuit 247 in such manner that the former would be operative to connect a different one of said base line potentiometers in said measuring and operating circuit for each of the switch positions.

As an alternative to the use of these base line potentiometers and operatively associated stepping switch means 250 to provide for base line adjustment, it may be understood that this same function may be accomplished by providing for adjustment in the amount of light from the colorimeter means light source which is enabled to pass from the latter to the colorimeter means flow cell.

Figure 3:
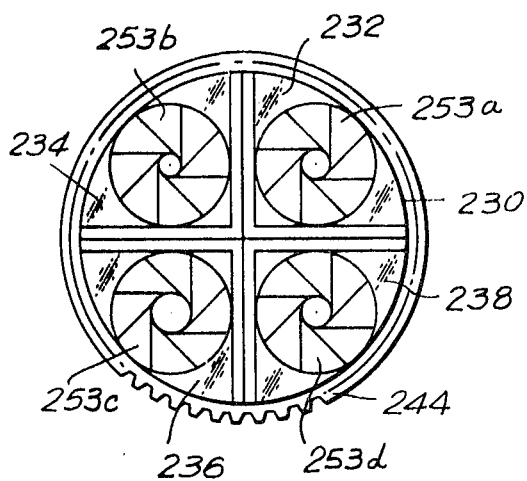
FIG. 3 is a side elevational view of colorimeter filter wheel means in the nature of those depicted in FIG. 2 and incorporating adjustable aperture means thereon.

One means of accomplishing this transmitted light adjustment is illustrated in FIG. 3, and may be seen therein to comprise the provision of four adjustable apertures as indicated at 253a, 253b, 253c and 253d, respectively on the filter wheel 230, with each of said adjustable apertures being operatively associated as shown with a different one of the filters 232, 234, 236 and 238, respectively, to thus enable adjustment in the amount of light passed thereto and provide a convenient, alternate means for accomplishing this 100 percent transmission or base line adjustment.

Debubbler means are indicated at 255 and may, for example, take the form as shown and described in said U.S. Pat. No. 3,241,432. The debubbler means comprise an inlet conduit 252, a gas outlet conduit 256 and a liquid outlet conduit 258 and are effective to substantially remove gases from the fluid stream flowing therein to through inlet conduit 252 by gravity effected gas-liquid separation, with the said gases flowing therefrom to atmosphere through gas outlet conduit 256 and a resultant, substantially gas-free liquid stream flowing therefrom through liquid outlet conduit 258.

The outlet of conduit branch 152 is connected as shown to the inlet conduit 252 of debubbler means 255, while the liquid outlet conduit 258 of the latter may be understood to be connected to the nonillustrated flow cell of the colorimeter means 224 for the flow of the substantially gas-free liquid stream through the said flow cell.

As an alternative to the above, the utilization in the colorimeter means 224 of a flow cell in the nature of that shown and described in U.S. Pat. No. 3,345,910 issued Oct. 10, 1967 to Seymour Rosin, et al., which flow cell includes debubbler means formed integrally therewith, would, of course, permit the elimination of the separate debubbler means 255 with attendant direct connection of the outlet conduit of conduit branch 152 to the inlet conduit of the said flow cell.

Readily adjustable, programmed timer means which may, for example, incorporate the operational principles of those shown and described in U.S. Pat. No. 3,388,687 issued June 18, 1968 to Nelson G. Kling, are indicated schematically at 260, and may be understood to be effective to selectively control the respective operations of the sample supply device 10, the plurality of conduit-contained valve means, and the filter wheel drive means 228 in predetermined, and readily adjustable, timed relationship.

More specifically, and assuming that each of the said sample supply device, valve means, and filter wheel drive means are electrically operated as discussed hereinabove, it may be seen that electrical leads as indicated at 262 for the sample supply device 10, 264 and 266 for the valve means 92 and 96—it being understood that like electrical leads are provided for each of the other disclosed valve means—and 268 for the filter wheel drive means 228, are provided to extend respectively therefrom into operative connection with the programmed timer means 260. Accordingly, it is believed made clear that the operational rate of the sample supply device 10, the respective dwell times of the off-take tube in the sample containers 14 and the wash liquid container 22, the respective openings and closings of the valve means and the respective dwell times thereof, and the operational rate of the filter drive means 228 and, if included, the stepping switch means 250, may be readily and effectively controlled from the programmed timer means 260, in predetermined timed relationship, by suitable energization and deenergization through the latter of the relevant electrical leads which connect the same.

To more clearly illustrate this operation, and assuming for example valve means 92 to be solenoid operated as discussed hereinabove and to open only when the solenoid thereof is energized, it may be understood that the opening of the said valve means may be effected by energization, through the programmed timer means 260, of lead 264 and that the dwell time of the said valve means will, of course, coincide with the extent of time for which the said lead is maintained energized.

Prior to a detailed description of the operation of the apparatus of the invention, it is to be understood that the same is arranged, primarily through proper selection of conduit and module or component lengths, internal conduit and pump tube diameters, and pumping rates from the pressure-pumping means, to provide for substantially identical fluid flow times from the respective fluid inputs of the apparatus to the conduit branch 152. This is to say, for example, that the time required for the flow of a discrete quantity of sample from a sample container 14, as mixed with one or more of the liquids from the respective flasks 212, 214, 40 and 42, to the conduit junction 152, should be substantially the same as the time required for the flow of a discrete quantity of any mixture of the liquids in flasks 216, 218, 220 and 222, including any discrete sample quantity as may be mixed therewith in the recipient passageway 106 of the dialyzer means 102 as described in detail hereinbelow, to the said conduit junction.

In order that this be accomplished, it must, of course, be provided that, in each instance wherein parallel flow paths exist as described in detail hereinabove, the flow times therethrough be maintained substantially the same despite the specific path provided.

More specifically, and taking for example the parallel flow paths provided by conduit 80 on the one hand, and conduit 84, incubating coil 86 and conduit 88 on the other, it may be understood that the respective coil and conduit lengths, and the respective internal diameters thereof, are chosen so that substantially the same time will be required for the flow of a discrete quantity of fluid through conduit 80 as will be required for the flow thereof through conduit 84, incubating coil 86 and conduit 88, respectively, to thus provide for substantially the same transit time from the downstream end of conduit 76 to the upstream end of conduit 98 despite the flow path utilized. These same considerations will, of course, apply with regard to the provision of substantial equality of flow times through conduit 110 on the one hand and conduit 108, dialyzer means donor passageway 104 and conduit 114 on the other; as well as with regard to like provision of substantially equal flow times through conduit 192 on the one hand and conduit 196, heating or reaction coil 198 and conduit 200 on the other.

OPERATION

In operation, for example, the testing of successive samples of blood through quantitative colorimetric analysis to determine the respective quantities of the total protein, calcium, albumin and blood urea nitrogen or BUN constituents thereof, in that order, it may be understood that each of the sample cups 14 of the sample supply device 10 would be filled with blood serum from a different blood sample, and the wash liquid container 22 filled with a suitable wash liquid in the nature, for example, of water of clinical purity. In addition, the respective flasks 212, 214, 220 and 222 would be filled with suitable color producing reagents for appropriate reaction with the particular constituents of interest to enable the colorimetric analysis therefor, all as described in detail in said U.S. Pat. No. 3,241,432. The flasks 40 and 42 and 220 would be filled with a suitable diluent in the nature, for example, of water of clinical purity, while the flasks 216 and 218 would be filled with a liquid suitable for the formation of recipient streams which may also be water of clinical purity.

The respective inlet ends of resiliently compressible pump tubes 28 and 30 would be open to the atmosphere, as illustrated, to provide for the pumping of air therethrough upon operation of the proportioning pump 26. Suitable air filter means could, of course, be provided at the said pump tube inlet ends for obvious purpose.

The filters 232, 234, 236 and 238 would be respectively chosen of such light transmittance wavelengths as to provide for maximum colorimeter means sensitivity for each of the constituents of interest, and arranged on the filter wheel 230 in the same order as that in which the said constituents are to be tested for. Thus, if it is assumed that filler 232 is appropriate for colorimetric analysis with regard to total protein, it may be understood that this filter would initially be disposed in operative position relative to the colorimeter means light source and flow cell.

If base line potentiometers and the stepping switch means 250 are to be utilized to provide the 100 percent light transmission or base line adjustment, it may be understood that the said switching means would be arranged to initially connect the base line potentiometer appropriate for the colorimetric analysis for total protein in the recorder measuring and operating circuit 247, and to connect the remaining base line potentiometers in the said recorder measuring and operating circuit in appropriate sequence in accordance with the order of analysis for the remaining constituents.

If, in the alternative, the adjustable aperture means of FIG. 3 were to be utilized to provide this 100 percent light transmission or base line adjustment, it maybe understood that aperture 253a would be adjusted to establish the base line for total protein analysis, aperture 253b adjusted to establish the base line for calcium, aperture 253c adjusted to establish the base line for albumin and aperture 253d adjusted to establish the base line for BUN.

Prior to commencement of operation, programmed timer 260 would be programmed to open valves 62, 92, 96, 118, 120, 136, 154, 164, 182, 212 and 206, only, upon energization of the apparatus.

If it is assumed that operation commences with the immersion of the off-take tube 18 into a blood serum sample cup 14, it may be understood that the said blood serum, mixed with a diluent from flask 40 and segmented by air from conduit 68, will be supplied to conduit 76, through conduit 72 and mixing coil 74, and will flow therefrom through conduit 84 to the incubating coil 86 and, from the latter, through conduits 88, 98, and 108, to the donor passageway 104 of the dialyzer means 102.

Simultaneously, a recipient stream from flask 216 segmented by air from conduit 156 will flow through conduit 168 to the recipient passageway 106 of the dialyzer means 102. The concomittant flow of these streams through the said dialyzer means will result in the transfer, through the dialyzer means membrane, of the calcium constituent from the suitably incubated donor stream to the recipient stream while the total protein constituent will remain in the donor stream.

The donor stream will flow from the dialyzer means 104 through conduits 114, 122 and 126, respectively, for combination with the reagent stream from conduit 132 at conduit junction 128 and will flow therefrom through the mixing coil 140 for suitable constituent-reagent, color-producing reaction.

Concomittantly, the recipient stream will flow from the dialyzer means 102 through conduits 170 and 176 for combination at conduit junction 178 with the reagent streams from conduit 179 for combination therewith and subsequent flow through conduit 184 to mixing coil 186 for suitable constituent-reagent, color-producing reaction.

Since total protein is the first constituent of interest, it may be understood that the donor system containing the same will flow from mixing coil 140, through conduits 142 and 150, to and through the debubbler means 255 and therefrom through the colorimeter means flow cell.

Concomittantly, the recipient stream containing the suitably color-reacted calcium constituent will simply be allowed to flow from the mixing coil 186 to waster through conduits 188, 192 and 204, respectively.

After the donor stream containing the suitably color reacted total protein constituent has been flowed through the colorimeter means flow cell for a period of time sufficient to provide for colorimetric analysis thereof for quantitative determination of the total protein constituent, and recording of the analysis results by recorder means 246, the programmed timer means 260 will operate to close valves 154 and 206, and open valves 148 and 210 to thus commence the flow of the recipient stream containing the suitably color-reached calcium constituent through conduit 208 and debubbler means 255 to and through the colorimeter means flow cell, while concomittantly flowing the remainder of the donor stream containing the total protein constituent to waste through conduit 146.

Simultaneously with the opening of valves 148 and 210, the programmed timer means will function to energize lead 268 to advance filter 234 to operative position relative to he colorimeter means light source and flow cell and, if utilized, advance stepping switch means 250 one position to connect the base line potentiometer appropriate for colorimetric analysis relative to calcium in the measuring and operating circuit 247 of the recorder means. If the alternative base line adjustment means of FIG. 3 are utilized, it may be understood that the suitably adjusted aperture means 253b will be automatically advanced into operative position by the advancement of the filter wheel 230.

After the recipient stream containing the suitably color reacted calcium constituent has been flowed through the colorimeter means flow cell for a period of time sufficient to provide for colorimetric analysis thereof for quantitative determination of the calcium constituent, and recording of the analysis results by recorder means 246, the programmed timer means 260 will operate through appropriate electrical lead energization and deenergization to modify the respective apparatus flow path configurations by placing valves 64, 94, 116, 154, 166, 180, 214, 216 and 206, only, in the respective open positions thereof.

Concomittantly, electrical lead 268 will be energized to advance filter 236 into operative position and, if utilized, advance stepping switch means 250 one position to connect the base line potentiometer appropriate for the colorimetric analysis with regard to the albumin constituent in the recorder measuring the operating circuit 247.

As a result of these programmed timer operations it may be understood that the serum stream from conduit 66 will be mixed with diluent from flask 42, and segmented by air from conduit 68, at the conduit junction 70 and will flow therefrom through conduit 72 to and through the mixing coil 74 and, through conduits 76, 80 and 108, respectively, to the donor passageway 104 of the dialyzer means 102.

Concomittantly, the recipient stream from flask 218 will be segmented by air from conduit 156 at conduit junction 158 and will flow therefrom to the recipient passageway 106 of the dialyzer means 102.

The concomittant passage of these donor and recipient streams through the dialyzer means 102 will result in the passage of the BUN constituent through the dialyzer means membrane to the recipient stream while the albumin constituent will remain in the donor stream.

From the donor stream passageway 104, the donor stream will pass, through conduits 114 and 122, to conduit junction 124 for combination with a reagent stream from conduit 130 and subsequent flow to and through the mixing coil 140 through conduits 126 and 138. Therefrom, this stream containing the now suitably color-reacted albumin constituent will flow, through conduits 142 and 150, a debubbler means 255, to and through the colorimeter means flow cell for colorimetric analysis thereof with regard to the albumin constituent.

Concomittantly, the recipient stream which now contains the BUN constituent of interest will be flowed, through conduit 170, to conduit junction 172 for combination with the reagent stream from conduit 174 and subsequent flow, through conduit 184, to and through the mixing coil 186. Therefrom, the now suitably color-reacted recipient stream will flow, through conduits 188 and 196, heating or reaction coil 198, and conduit 200, to waste through conduit 204.

After the donor stream containing the suitably color-reacted albumin constituent has been flowed through the colorimeter means flow cell for a period of time sufficient to provide for colorimetric analysis thereof for quantitative determination of the albumin constituent, and recording of the analysis results by recorder means 246, t programmed timer means 260 will operate to open valves 210 and 148, and close valves 154 and 206, to thus commence the flow of the recipient stream containing the suitably heated and color-reacted BUN constituent, through conduit 208, and debubbles means 255, to and through the colorimeter means flow cell, while concomittantly providing for the flow of the remainder of the donor stream to waste through conduit 146.

Simultaneously with the opening of valves 210 and 148, the programmed timer means 260 will operate to again energize lead 268 to advance filter 238 into operative position and, if utilized, effect appropriate base line potentiometer connection through advancement of the stepping switch means 250 to the final position thereof.

After he recipient stream containing the suitably color-reacted BUN constituent has been flowed through the colorimeter means flow cell for a sufficient period of time as discussed in detail hereinabove with regard to the preceding constituents, it may be understood that the offtake tube 18 will be lifted from the serum sample container 14 and moved for immersion in the wash liquid container 22 to thus provide a relatively large segment of air followed by a stream of wash liquid—which will in turn be followed by another relatively large segment of air following advancement of the table 16 and the subsequent movement of the off-take tube 18 from the wash liquid container 22 to the succeeding serum sample container 14—for flow through the conduit 66. At this point, programmed timer means 260 will operate to close valves 134, 136, 148, 62, 64, 180, 182 and 206, only, while opening all of the other valves. As a result only the said air segments and wash liquid stream, the air segments from conduits 68 and 156, and the recipients from flasks 216 and 218, respectively, will be flowed through the apparatus for the duration of the time period that the off-take tube 18 is not immersed in a serum sample. The effect of this will, of course, be to suitably cleanse the colorimeter means flow cell, the dialyzer means 102, and all of the system tubes, conduits and coils to remove all traces of the blood serum sample just analyzed therefrom prior to the introduction of the succeeding serum sample thereto. Preferably, the programmed timer means 260 would be arranged to close valves 94, 116 and 212, and open valves 92 and 96, 118 and 120, and 214 and 216, respectively, for some portion of this apparatus cleansing period to insure a sufficient cleansing flow of the air-segmented wash liquid through each of the incubating coil 86, the donor passageway 104 of the dialyzer means 102 and the heating or reacting coil 198.

As soon as the off-take tube 18 is immersed in the next blood serum sample container 14 presented thereto by advancement of the turntable 16, the operational cycle described in detail hereinabove would, of course, be repeated, as it would be for each succeeding blood serum sample until all of the latter had been analyzed.

Wide variation is, of course, made possible in the operational cycle of apparatus through suitable variation in the programming of the programmed timer means 260. Thus, for example, although for clarity of description the said operational cycle is described hereinabove as requiring the completion of the colorimetric analysis for one constituent before change in apparatus flow path configuration to prepare a succeeding quotient of the same serum sample stream for colorimetric analysis with regard to a different constituent, it may be understood that the latter may alternatively be commenced before the completion of the former to thus prevent an undue time lag between effective colorimetric analyses with regard to different constituents.

In addition, it is believed clear that the described sequence of colorimetric analysis of the respective donor and recipient streams is for purposes of illustration, only, and that wide variation may be made therein. Further, and as discussed hereinabove, it is to be understood that the number and specific identify of the respective constituents of interest as described hereinabove were chosen for purposes of illustration, only, to provide a representative description of the operation of the apparatus, and that different numbers of different constituents can, of course, be made the object of accurate quantitative colorimetric analysis through appropriate programming of the programmed timer means 260.

It is also to be understood that the specifically illustrated flow path configurations of the apparatus, although of course representative of a currently preferred embodiment thereof, are by no means the only configurations possible within the scope of the invention and that other and different flow path configurations may, of course, be readily provided. Of particular interest, however, with regard to the illustrated flow path configurations if believed due to the fact that the same do provide for significant versatility in the operation of the apparatus by enabling the use thereof in the quantitative analysis of blood serum samples for a wide variety of the significant constituents thereof. This is to say that the illustrated combination of conduits, coils, and dialyzer and valve means, and the respective illustrated manners of interconnection therebetween, do provide an apparatus manifold which embodies significant universal or multipurpose aspects insofar as the automatic, sequential quantitative analysis of a series of blood serum samples is concerned.

Finally, it is believed clear that the method and apparatus of the invention are by no means limited to the analysis of fluid samples which are constituted by blood or blood serum.

While we have shown and described the preferred embodiment of our invention, it will be understood that the invention may be embodied otherwise than as herein specifically illustrated or described, and that certain changes in the form and arrangement of parts and in the specific manner of practicing the invention may be made without departing from the underlying idea or principles or this invention within the scope of the appended claims.

I claim:

1. In apparatus which includes fluid sample supply means 10 for the supply of quotients of a sample of a series of fluid samples thereto and fluid sample analysis means 224 for the sequential analysis of said quotients with respect to different constituents thereof, the combination comprising, means providing different flow paths (76, 108, 114, 126, 142, 150 and 170, 176, 192 and 208) for the simultaneous flow of said quotients from said sample supply means along said flow paths and ultimately to said sample analysis means different samples treatment means (90, 130, 132 and 74, 129, 202) in communication with said different flow paths for treating said quotients for analysis with respect to different ones of said constituents, valve means (92, 94, 96, 134, 136 and 180, 182, 212, 214, 216) for selectively controlling the flow of said quotients through the flow paths and exposure of said quotients to said sample treatment means, and control means (260) for selectively opening and closing said valve means in predetermined sequence during operation of the apparatus for simultaneous flow of different ones of said quotients in different ones of said flow paths and for exposure to different ones of said sample treatment means and sequential flow from the last mentioned paths to said analysis means for analysis of said quotients with respect to said different constituents, 2. In apparatus as in claim 1 wherein, said fluid sample analysis means are constituted by single analysis means.

3. In apparatus as in claim 1 wherein, said different flow paths are arranged to provide substantially equal flow times for said sample portions between said sample supply means and said analysis means.

4. In apparatus as in claim 1 wherein, said fluid sample analysis means comprises colorimeter means including a plurality of light filter means, each of which is appropriate to sample analysis for a different one of said constituents, and light filter positioning means operable in response to said control means to sequentially, operatively position said light filter means in accordance with the sequence of analysis for said different constituents.

5. In apparatus as in claim 1, wherein said sample treatment means includes means to introduce different sample treatment fluids to said different flow paths.

6. In apparatus as in claim 4 further comprising, recorder means operatively associated with said colorimeter means and operable to record the results of the analyses performed thereby on recorder chart means, said recorder means comprising a measuring and operating circuit, a plurality of adjustable base line potentiometers connectable in sequence in said measuring and operating circuit, each of said base line potentiometers being appropriate to establish the base line on said recorder chart means for a different one of said constituents, and switching means operable in response to said control means to connect said adjustable base line potentiometers in sequence in said recorder means measuring and operating circuit in accordance with the sequence of analysis for said different constituents.

7. In apparatus as in claim 4 further comprising, recorder means operatively associated with said colorimeter means and operable to record the results of the analyses performed thereby on recorder chart means, and a plurality of adjustable apertures, each of which is operatively associated with a different one of light filter means to control the amount of light transmitted therethrough, and is thus operable to establish the base line on said recorder chart means for a different one of said constituents.